March 13, 1928. 1,662,640
L. GARRETSON
SAFETY JET GUARD FOR GAS RANGES
Filed Feb. 16, 1927
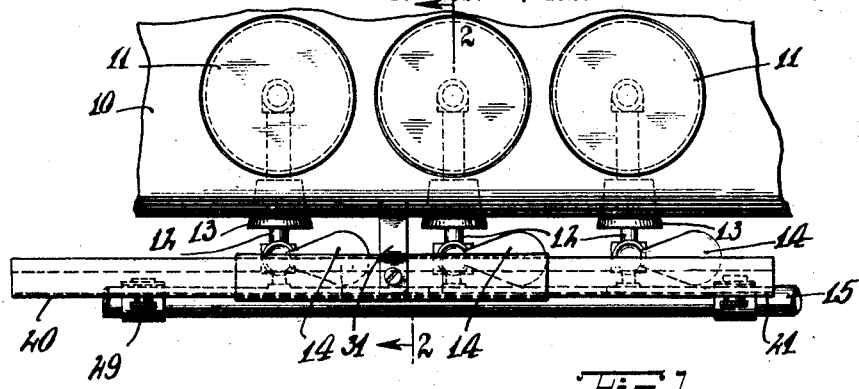
INVENTOR
Louis Garretson
BY
Zoltan H Polachek
ATTORNEY Patented Mar. 13, 1928.

1,662,640

UNITED STATES PATENT OFFICE.

LOUIS GARRETSON, OF NEW YORK, N. Y.

SAFETY JET GUARD FOR GAS RANGES.

Application filed February 16, 1927. Serial No. 168,605.

This invention relates to a new and useful device in the nature of a safety jet guard for gas ranges, particularly adapted to prevent the accidental turning on of the gas to the gas ranges equipped with my improved device.

The object of the invention is to provide a safety jet guard of novel construction and arrangement of parts, hereinafter more fully described, claimed, and illustrated in the accompanying drawing.

Fig. 1 is a fragmentary top plan view of a gas range equipped with my improved device.

Fig. 2 is an enlarged sectional view taken on the line 2—2 of Figure 1.

Fig. 3 is a detail view of the clamp member, showing same in a partly closed position.

Fig. 4 is an enlarged fragmentary perspective view of the guard proper as embodied in my improved device.

Fig. 5 is a similar view to that shown in Figure 3, illustrating the clamp member in a fully open position.

Fig. 6 is an enlarged fragmentary front elevational view illustrating a modification of my improved device.

Fig. 7 is a sectional view of a modified clip.

The plate 10, or top member, the burners 11, connected by means of the tubular members 12, provided with the usual air regulating devices 13, and shut off valves 14, to the main line 15, pipe or tubular member, are the general elements of a gas range such as ordinarily used for cooking purposes, and the like. It should be understood that I do not necessarily limit the use of my improved device to the type of gas range as above described and set forth, but to all classes and types of gas ranges such as commonly used. It should be understood that the main line 15 is suitably connected to any convenient source of illuminating gas supply.

As here embodied my improved device comprises a main guard 16, having an upper portion 17 formed at a right angle thereto, and having its upper extremity 18 formed parallel thereto, slightly below the said upper portion 17. The above described construction is such as will provide a recess or groove, adapted to slidably receive the upper portions 19 of the extension members 20 and 21, which are provided with lower extended portions 22, adapted to engage inside the main guard 16. The above described construction is such as will permit the extension members 20 and 21 to be slidably extended from the main guard 16, any predetermined distance or length so as to extend the entire length of the gas range, to which same is attached as clearly shown in Figure 1.

The clamp members 23 are formed or bent circular, so as to engage over the main line 15 of the gas range. The clamp members 23 are provided with upper extended elements 44 and 25 having pairs of apertures 26 and 27 adapted to receive a threaded member 28 provided with an enlarged head 29, and the usual nut 30 as a means of clamping the guard 16 and the extension members 20 and 21 to the main line 15. The above described construction is such as will permit the guard 16 and the extension members 20 and 21 to prevent the turning on or opening of the shut off valves 14 as clearly shown in Figures 1 and 2, when my improved device is positioned as clearly shown in the above mentioned Figures 1 and 2. The guard 16 has attached thereto, and extended therefrom a clip member 31, provided with a hook shaped extremity 32, adapted to engage the outer edge of the above mentioned top member 10 of the gas range. The latter described construction is such as will securely hold my improved device in the above mentioned position. It should be understood that the clip member 31 may be disengaged from the top member 10, and my improved device rotated or hinged downwardly as designated by the reference numeral 33, and shown in dot and dash lines, so as to permit the shut off valves 14 to be opened when desired.

In Figure 5 of the accompanying drawing, I have shown the extended element 44 of the clamp member 23 formed or bent downwardly as at 34, so as to permit the clamp member 23 to engage a main line 15 of relatively larger diameter of size.

In Figures 4 and 6 of the accompanying drawing, I have shown the extension members 20 and 21 having their lower extremities formed or bent upwardly as at 35, so as to provide a recess or groove, adapted to slidably receive the doors 36, which are provided with indentations 37 as a means of sliding the doors 36, so as to open apertures 38, provided in the extension members 20 and 21 as a means of permitting the shut off valves 14 to be opened. Similar openings 39 are formed in the guard proper 16 for the purpose as above set forth.

In Figure 7 I have shown a clip 31′ having attached thereto an extension 31$^a$ by means of a bolt 31$^b$ or the like. The member 31$^a$ is provided with a slot 31$^c$ to allow the extension of the said member so that hook 32 may be adjusted to fit various size ranges.

Having thus described my invention, what I claim as new and desire to protect by Letters Patent of the United States is as follows:

1. The combination with a gas range having a top member, and a main gas pipe with valves, of a main guard provided with openings, extension members slidably arranged on the main guard, and also provided with openings, the said openings being in the vicinity of the valves, doors slidably arranged on the main guard and extensions, forming a closure for the openings, means for movably supporting the extension members to the main gas pipe, and a hook shaped clip secured on the main guard and engageable with the said top member.

2. In a device of the class described, a main guard provided with openings, extension members slidably arranged on the main guard, and also provided with openings, and doors slidably arranged on the main guard, and on the extension members, forming closures for the said openings.

3. In a device of the class described, a main guard provided with openings, extension members slidably projecting from the ends of the main guard, and also provided with openings, and doors slidably arranged on the main guard and on the extension members, forming closures for the said openings.

In testimony whereof I have affixed my signature.

LOUIS GARRETSON.